May 14, 1946.  W. H. TAYLOR ET AL  2,400,444
STOP NUT
Filed June 21, 1943

Inventor
William H. Taylor and
Robert E. Workman

By

Attorney

Patented May 14, 1946

2,400,444

UNITED STATES PATENT OFFICE 2,400,444

STOP NUT

William H. Taylor, Akron, and Robert E. Workman, Ravenna, Ohio, assignors to Wingfoot Corporation, Akron, Ohio, a corporation of Delaware Application June 21, 1943, Serial No. 491,574

1 Claim. (Cl. 151—7)

The stop nut of this invention is of an improved design. It is made of plastic and includes a fiber-board insert. The stop nut is provided with a central threaded opening for anchoring a bolt, and means is provided for riveting the stop nut to a metal sheet, such as the skin of an airplane wing or other base material to which it is to be united.

It was found that in riveting plastic nut plates to a base material, the increase in the size of the rivet produced by squeezing or driving with a hammer caused the plastic to crack. The present invention prevents such cracking. This is accomplished by providing a fiber-board or other yieldable insert around the rivet holes in the plastic nut plate at or near the exposed surface at which the enlargement of the rivet occurs on squeezing and by firmly uniting the fiber board, etc., to the plastic at the rivet holes. The bond between the fiber board and plastic is preferably formed by merely molding the plastic around the insert. The plastic employed for the stop nut may be a Bakelite composition, and fiber board or other suitable compressible material may be used for the inserts around the rivet holes. By placing the insert so that it partially obstructs the central threaded opening, it will lock in place any bolt threaded into the opening.

Figure 1:
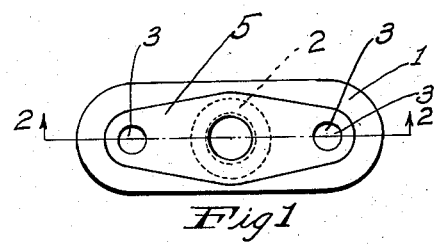
Figure 2:
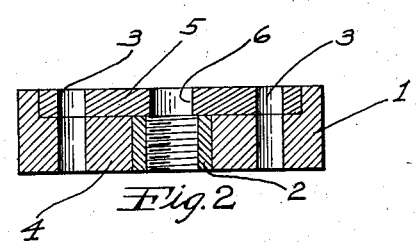

The invention will be further described in connection with the accompanying drawing, in which Fig. 1 is a plan view of the stop nut and Fig. 2 is a section on the line 2—2 of Fig. 1. The reference numeral 1 indicates the portion of the nut plate which is made of plastic material. A metal insert 2, threaded on the interior, receives the bolt which is to be fastened by the nut plate. Rivet holes 3 are provided at each end in the customary manner. The bottom surface 4 of the nut plate rests against the metal surface to which it is to be united. The rivet heads are below this, and the rivets project up through the holes 3. When the nut plate is in place, the upper ends of these rivets are headed. The squeezing or driving of the rivets causes an increase in the diameter of the rivet near the driven head end. It is this portion of the rivet hole surrounding the portion of the rivet which may become enlarged that is protected by the fiber board. Instead of using individual pieces of fiber board for each rivet hole, it is advantageous to use a single piece which surrounds each of the rivet holes and also the central opening. The fiber-board piece is indicated in the drawing by the reference numeral 5. It may, for example, be about $\frac{1}{16}$ inch thick, more or less.

It will be noted from the drawing that the opening 6 in the fiber board is of somewhat smaller diameter than the central opening in the metal insert 2. It is made somewhat smaller than the outside diameter of the screw thread of the central opening so that when a bolt is threaded into the opening, it is forced to form threads through the fiber board. This causes the fiber board to grip the bolt and prevent it from shaking loose. The fiber board thus serves to make the stop nut a lock stop nut.

What we claim is:

A plastic stop nut adapted to be secured to a structure by means of a rivet, said nut having a rivet hole therein for the reception of said rivet, and a yieldable insert secured within a counterbore to one face of the nut including an insert hole adjacent one end of and in axial alignment with the rivet hole and positioned to yield under the enlargement of the rivet when said rivet is being squeezed into fixed position.

WILLIAM H. TAYLOR.
ROBERT E. WORKMAN.